(12) United States Patent
Bostick et al.

(10) Patent No.: US 10,825,070 B2
(45) Date of Patent: Nov. 3, 2020

(54) PROBLEM IDENTIFICATION USING BIOMETRIC AND SOCIAL DATA

(71) Applicant: INTERNATIONAL BUSINESS MACHINES CORPORATION, Armonk, NY (US)

(72) Inventors: James E. Bostick, Cedar Park, TX (US); Danny Y. Chen, Austin, TX (US); Sarbajit K. Rakshit, Kolkata (IN); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 16/166,370

(22) Filed: Oct. 22, 2018

(65) Prior Publication Data

US 2020/0126141 A1    Apr. 23, 2020

(51) Int. Cl.
*G06Q 30/00* (2012.01)
*G06Q 30/06* (2012.01)
*G06F 3/01* (2006.01)
*G06Q 50/00* (2012.01)

(52) U.S. Cl.
CPC ......... *G06Q 30/0627* (2013.01); *G06F 3/011* (2013.01); *G06Q 30/0631* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 6,873,967 B1 | 3/2005 | Kalagnanam et al. | |
| 8,359,285 B1 | 1/2013 | Dicker et al. | |
| 9,148,353 B1* | 9/2015 | Pasqua | H04L 43/065 |
| 9,691,081 B2 | 6/2017 | Kritt et al. | |
| 2002/0065721 A1 | 5/2002 | Lema et al. | |
| 2014/0344102 A1 | 11/2014 | Cooper | |
| 2015/0170152 A1* | 6/2015 | Shaffer | G06Q 30/016 |
| | | | 705/304 |
| 2018/0114063 A1* | 4/2018 | Wexler | G06T 1/0007 |

OTHER PUBLICATIONS

Peter Mell et al, The NIST Definition of Cloud Computing, National Institute of Standards and Technology, Publication 800-145, 2011, entire document.
Rachel Metz, Soon your doctor will be able to wirelessly track your helath—even through walls, Intelligent Machines, 2018, entire document.

* cited by examiner

*Primary Examiner* — Mila Airapetian
(74) *Attorney, Agent, or Firm* — Patrick J. Daugherty; Daugherty & Del Zoppo Co., LPA

(57) ABSTRACT

Embodiments recognize and solve problems as a function of biometric and social network data, wherein processors are configured to determine that an e-commerce site user is currently experiencing a problem in association with a purchase of an item on the e-commerce site as a function of analyzing biometric data acquired from the user in association with the item purchase. The processors are further configured to correlate the first problem associated with the item purchase to an alternative problem that is associated with the item purchase as a function of social network data of the user; and to suggest the alternative problem to the user as another problem experienced by the user in association with the item purchase.

20 Claims, 4 Drawing Sheets

PROBLEM IDENTIFICATION USING BIOMETRIC AND SOCIAL DATA

BACKGROUND

A social network is a social structure made up of a set of social actors (such as individuals or organizations), sets of dyadic ties, and other social interactions between actors. A social networking or social media service or site is an online platform which people use to build social networks or social relations with other people who share similar personal or career interests, activities, backgrounds or real-life connections. Social networking service applications may incorporate a range of information and communication tools, and operate (execute) on a variety of different programmable devices (desktop and on laptop computers, tablet computers and smartphones and other mobile devices, etc.)

Social networking sites enable users to share ideas, digital photos and videos, posts, and to inform others about online or real-world activities and events with people in their network. The Internet and other wide area network (WAN) structures enable social networking applications to connect users in real-time to others in different geographic locations spanning across the world. Thus, a user shopping or completing a purchase of goods or services on an online retail or other electronic commerce (e-commerce) site may share the purchase information with their social network connections (contacts, friends, family, business or school colleagues or alumni, etc.). Each of the linked contacts is then potentially or immediately informed of the purchase, and such information may be useful to their own purchasing decisions, wherein the purchase of a friend functions as a recommendation over competing products, resulting in the contact viewing the purchased item, and even add the item to their own wish-list or electronic shopping. The contacts may give feedback useful to the purchaser with regard to their own experience with the purchased item, which the sharing contact may use in deciding to maintain or repeat the purchase.

Biometric data generally refers to body dimension and physical behavior measurement values and calculations. Biometric identifiers may refer to distinctive, measurable characteristics used to label and describe individuals. Behavioral characteristics are related to the pattern of behavior of a person, including but not limited to typing, rhythm, gait, and sleep and voice qualities and patterns.

SUMMARY

In one aspect of the present invention, a computerized method includes executing steps on a computer processor. Thus, a computer processor is configured to determine that an e-commerce site user is currently experiencing a (first) problem in association with a purchase of an item on the e-commerce site as a function of analyzing biometric data acquired from the user in association with the item purchase. The processor is further configured to correlate the first problem associated with the item purchase to an alternative problem that is associated with the item purchase as a function of social network data of the user; and to suggest the alternative problem to the user as another problem experienced by the user in association with the item purchase.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to determine that an e-commerce site user is currently experiencing a (first) problem in association with a purchase of an item on the e-commerce site as a function of analyzing biometric data acquired from the user in association with the item purchase. The processor is further configured to correlate the first problem associated with the item purchase to an alternative problem that is associated with the item purchase as a function of social network data of the user; and to suggest the alternative problem to the user as another problem experienced by the user in association with the item purchase.

In another aspect, a computer program product for recognizing and solving a problem as a function of biometric data has a computer-readable storage medium with computer readable program code embodied therewith. The computer readable program code includes instructions for execution which cause the processor to determine that an e-commerce site user is currently experiencing a (first) problem in association with a purchase of an item on the e-commerce site as a function of analyzing biometric data acquired from the user in association with the item purchase. The processor is further thereby caused to correlate the first problem associated with the item purchase to an alternative problem that is associated with the item purchase as a function of social network data of the user; and to suggest the alternative problem to the user as another problem experienced by the user in association with the item purchase.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
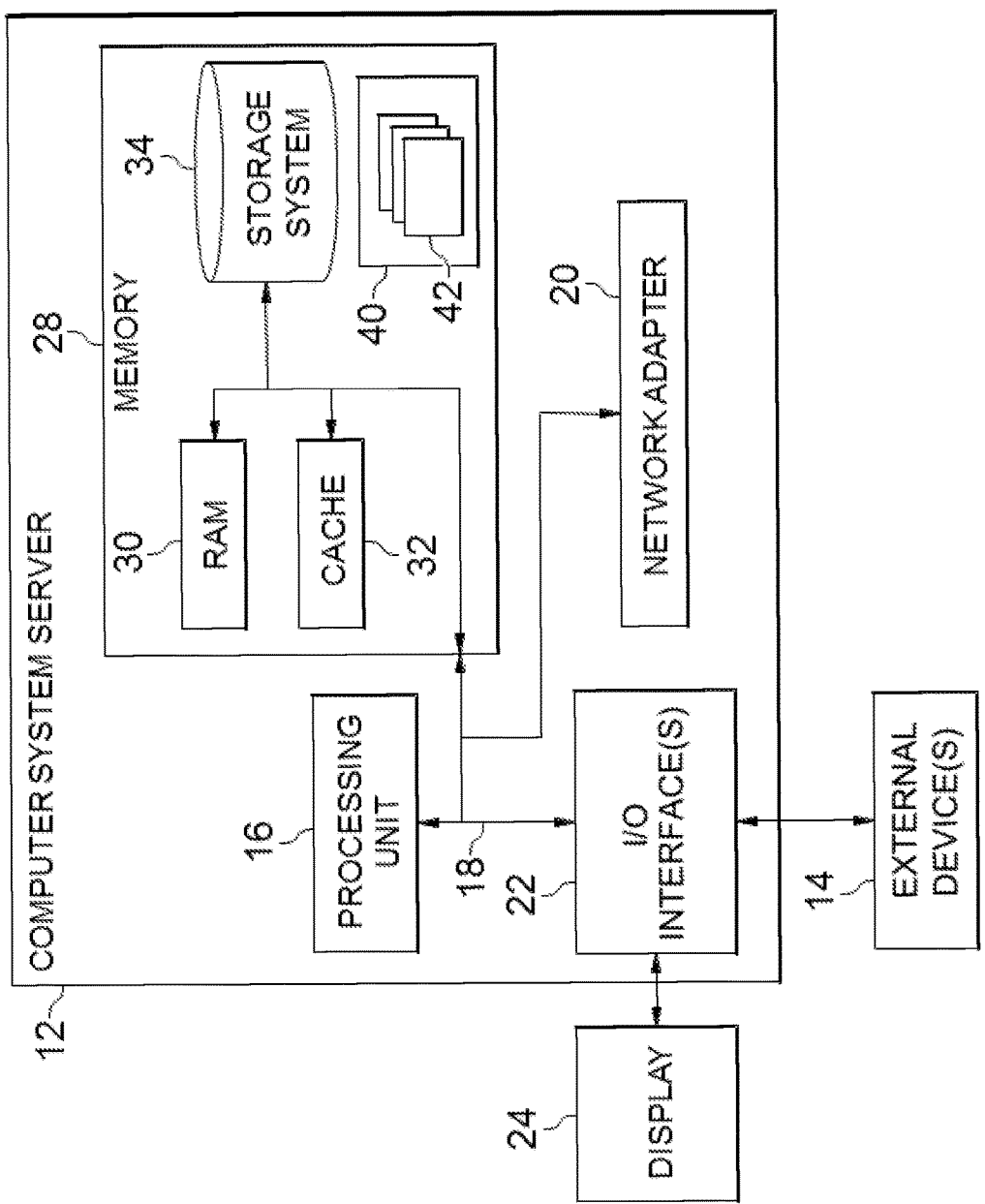
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
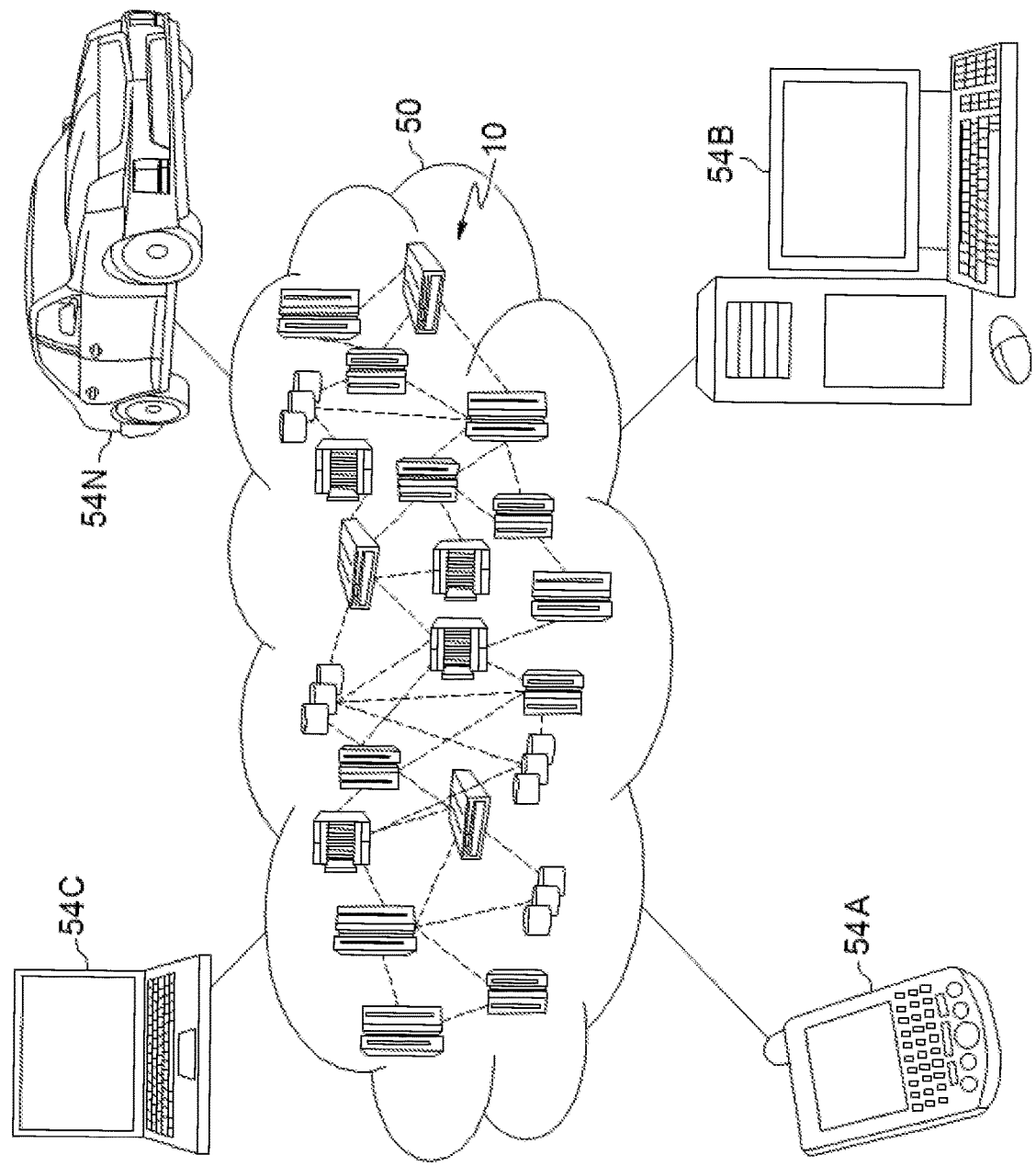
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for recognizing and solving a problem as a function of biometric and social network data according to aspects of the present invention 96.

Figure 3:
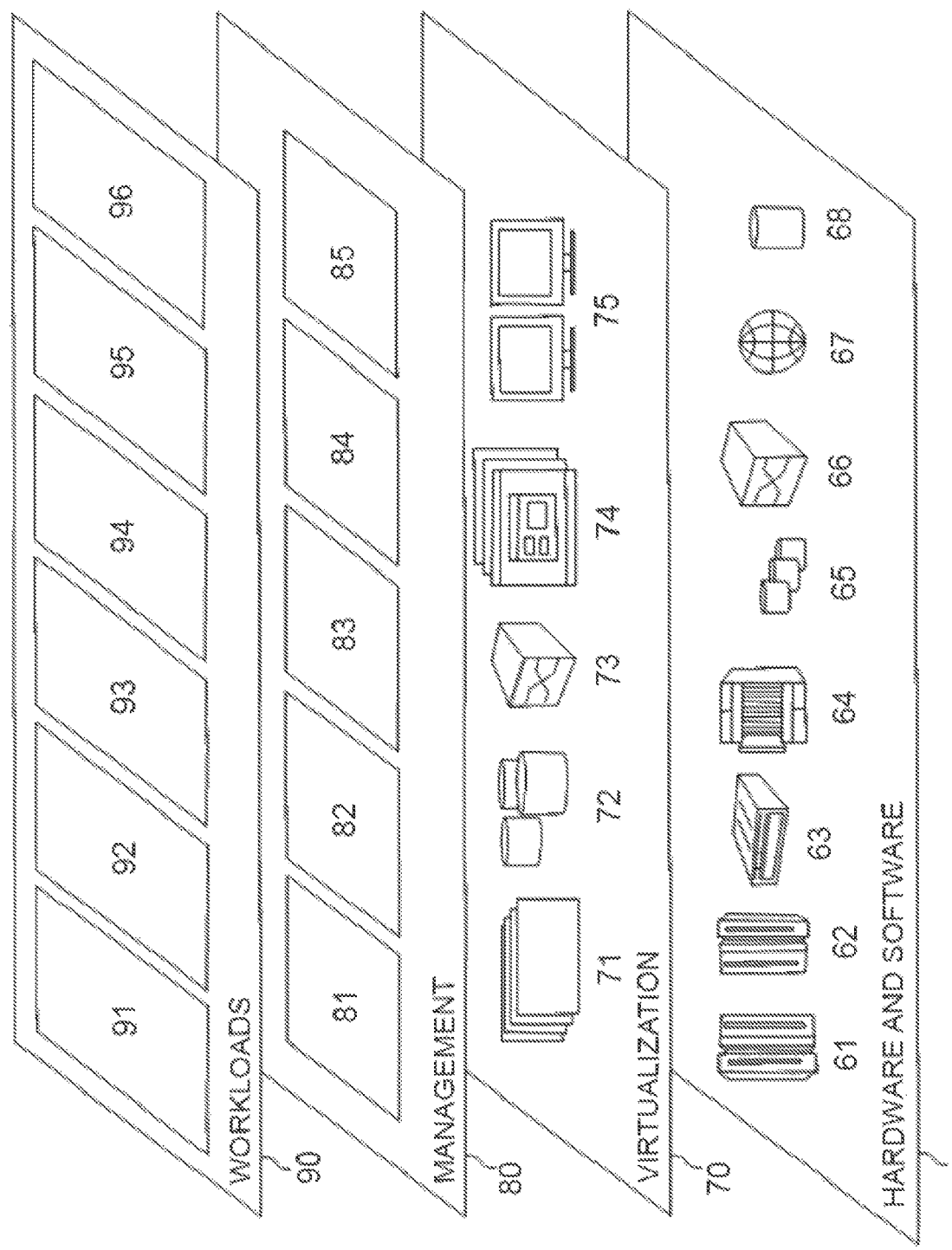
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein.

Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 4:
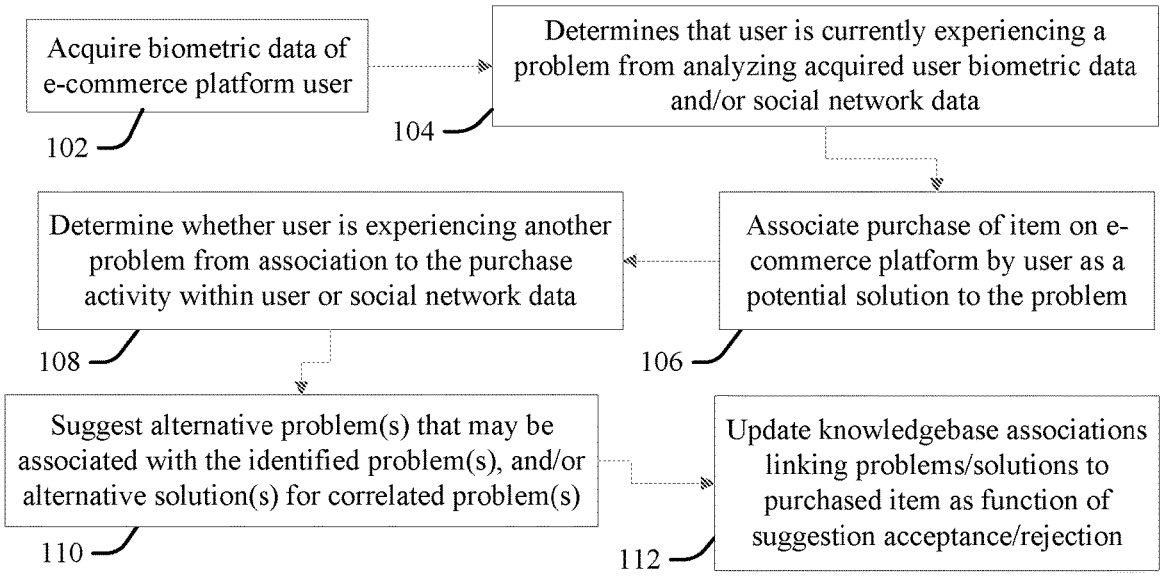
FIG. 4 is a flow chart illustration of an embodiment of the present invention.

FIG. 4 illustrates a system, process or device according to one embodiment of the present invention. At 102 a device processor acquires current (real-time) biometric data of an e-commerce platform user from one or more biometric sensors in (wired or wireless) circuit communication with the processor. Illustrative but not exhaustive examples of biometric sensors include cameras or other visual data scanners; microphones and other audio data sensors; and smart watches, fitness trackers and other wearable devices, and other devices located near enough to the user to acquire biometric data as a function of their sensor components, that acquire physiological user data (for example, heartbeat, heartrate, respiration amounts or rates or constituent components, blood oxygen, motions, insulin levels, blood sugar levels, etc.)

Biometric sensor types include a variety of Internet of Things (IoT), Bluetooth®, or other wired or wireless devices that are personal to the user, and/or incorporated within environments (room, vehicle, home, office, etc.) occupied by the user. Some environmental biometric signal sensors transmit a low-power wireless signal throughout an environment or space occupied by a user (for example, throughout a one- or two-bedroom apartment, inclusive of passing through walls), wherein the signal reflects off of the user's body, and the device uses machine learning to analyze the reflected signals and determine and extract breathing, heart rate, sleep pattern or quality, gait and other physiological, biometric data of the user.

Thus, at 102 the configured processor uses the sensor(s) to gather current biometric signals of the user, including during interaction with a specific, associated device or physical component, that are inclusive of facial and other body configurations and movements and patterns over time, inclusive of facial expressions (smiles, grimaces, eye reactions and positioning and movements), physical gestures, vocal tones and volumes and spoken word tone analysis, etc. Such data may be associated with performance of specific, associated devices or physical components, including via data from social networks contacts or user history. Thus, embodiments may thereby associate movements indicative of a problem experienced by the user to different types of problem historically of the user or social contacts thereof, including as associated to specific devices or physical components.

At 104 the configured processor determines that the user is currently experiencing a problem from analyzing the current user biometric data acquired at 102. In some embodiments problem occurrence determinations are made at 104 by matching biometric data patterns to data patterns that are labelled within a labelled dataset knowledge base as problematic patterns.

Labeled data refers to a group of samples that have been tagged (via manual, human processes, or via machine learning processes) with one or more meaningful labels or tags that are informative or descriptive of the labelled data. For example, each of a dataset of images of human faces may be labeled to describe emotions conveyed by faces in the respective images (such as grimaces, expressions of pain, dismay, exasperation, displeasure, etc.). Videos of body movements may be labelled as to quality or type of action performed: for example, a dataset video showing both arms raised or swung around rapidly while the person is standing may be labeled as "angry" or "upset" or "frustrated." Thus, embodiments may determine that the user is currently experiencing a problem by matching current biometric image or video data of face or body movements of the user to image or video image data that is labeled as a grimace, expression of pain, dismay, exasperation, displeasure, angry, upset, frustrated, etc.

Embodiments may match audio biometric data patterns or attributes (voice tones, volume, cadence, etc.) to corresponding audio data labelled within a dataset as indicative of anger, sadness, frustration and other problem-related vocal utterances to determine that the user is currently experiencing a problem at 104.

Embodiments may apply natural language processing (NLP) or other text-to-speech processing to audio biometric data to identify spoken word text content and thereby match text content to exclamation text content associated with or labeled as problematic exclamations or indicators to determine that the user is currently experiencing a problem at 104 (for example, matching key or words).

The likelihood of a problem experience identification at 104 may also be a function of (dependent upon or determined (in part) by) social network activity of the user that is contemporaneous with the biometric data. For example, embodiments may apply NLP processing to text content of a social networking site posting by the user to determine that the text content comprises a known (labeled) problem statement (for example, "I hate my phone charging cord!") occurs within a threshold contemporaneous time period (one minute, thirty minutes, same day, etc.) of an expression of the user within captured biometric data that matches a labelled "grimace" face pattern within a labeled dataset, and thereby determine that the user is experiencing a problem with an identified text content item (a charging cord).

At 106 the configured processor associates a purchase of an item (goods or service) on the e-commerce platform by the user with the problem identified at 104 as a potential solution to the problem. More particularly, while the user is purchasing a product on the e-commerce site, the configured processor determines that it is likely that the purchase is correlated to a solution of one or more of the currently experienced problems identified at 104. For example, a correlation is made at 106 as a function of social network data that indicates that social network contacts of the user have purchased the item in association to correlated problem, and/or as a function of vocal utterance recognized within the biometric data (for example, "This should solve the problem!") or an improvement in facial expression, heartrate, etc., that indicates a (likely) satisfaction of the problem.

Association of an item purchase with a currently experienced problem may also be independent of direct association to the biometric or social network data of the user. For example, an embodiment determines that the purchase of a new charging transformer and cord for a specific smart phone within less than one (1) year from a historic purchase of the specific smart phone is less than an expected or standard time of obsolescence of an original charging transformer and cord supplied with the specific smart phone, and therefore that this purchase is likely to replace a loss of the original charging transformer and cord, or to replace a defective and unsatisfactory original charging transformer and cord, and therefore that the user is highly likely to be upset (including in proportion to the purchase price of the new charging transformer and cord, and in some cases relative to recent annual income data of the user).

At 108 the configured processor determines that the user is (likely) experiencing another problem not identified from the biometric data at 104, but instead from association to the purchase activity of the user, in some examples as a function of historic knowledge base data inclusive of social network data. Thus, a home networking system incorporating the configured processor may autonomously determine that the user is facing a problem, and identify other, additional appropriate products or accessories which can solve the problem of the user, independent of biometric data analysis.

At 110, in response to correlating the purchase of the item with a problem identified at 106 or 108, the configured processor drives an audio or visual component to communicate one or more alternative, problems that may be associated with the identified problem, and/or alternative suggested solutions for the correlated problem. For example, the configured processor drives a graphical user interface (GUI) display device to show a list of selectable (via a cursor or other input selection) other possible solutions, or additional problems that social network data has found to be commonly associated with the identified problem for which user is purchasing the product; or a speaker component may recite the suggestions in an audio broadcast.

At 112, the configured processor updates, within user and social network data, knowledgebase data regarding strengths of association linking the identified, suggested or related problems and/or solutions to the item purchased by the user as a function of an amount of acceptance of each of the suggestions made at 110, wherein values of the amount of acceptance is inclusive of acceptance or rejection of the suggestions. More particularly, the configured processor updates or creates knowledgebase entries of strengths of association linking ones, or types, of the identified or related problems and which the item is (likely) purchased by the user. Thus, the configured processor learns or trains appropriate e-commerce item recommendations that may be provided to other users in response to being associated (including strongly enough, via comparison to a threshold) to the associated or linked problems.

Embodiments of the present invention recognize that the purchase of any service, product or accessory may be motivated by the need to solve a problem. Thus, in response to determining that the purchase of a product is (likely) a work-around or other indirect solution to an existing problem, or to fix a defect (as determined at 102 and 104), embodiments of the present invention may suggest another, alternative purchase of goods or services (at 110) that is determined to be more likely to solve the problem, or more directly related to the identified problem.

Figure 5:
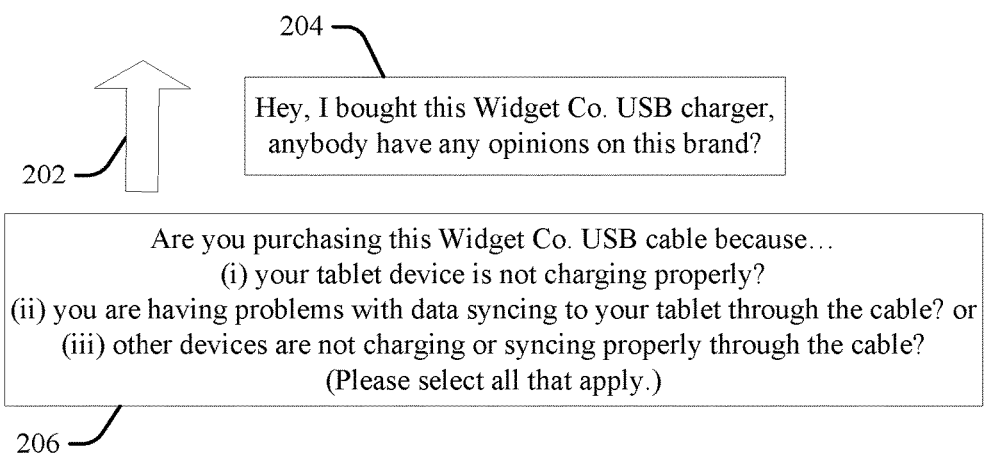
FIG. 5 is a graphic illustration of an implementation of an embodiment of the present invention.

FIG. 5 illustrates one implementation of an embodiments of the present invention, wherein a user is experiencing longer times than normal or typical to charge a tablet computing device. Suspecting that the problem is caused by a defective charging cable, the user purchases another cable 202 via an e-commerce site, and shares the purchase by a posting 204 on a social network of the user ("Hey, I bought this Widget Co. USB charger, anybody have any opinions on this brand?"). In response to said user purchase activity, the configured processor identifies (at 106, FIG. 4) that dissatisfaction with charging behavior of a tablet device of the user is the problem that is most likely being solved by this purchase, from recognizing (at 104, FIG. 4) negative vocal utterances associated with unplugging or plugging another Universal Serial Bus (USB) charging cable into the device within audio data acquired, and/or comments linked to purchases of the same item by social contacts of the user. Thus, embodiments of the present invention automatically predict (at 108, FIG. 4) other possible problems for which user is purchasing the product or accessories, and (at 110, FIG. 4) generate a pop-up window 206 (within a GUI that displays the item purchased 202 and the social network posting 204) that suggest a list of other, possible problems for the user to confirm or select, namely "Are you purchasing this Widget Co. USB cable because . . . (i) your tablet device is not charging properly?; (ii) you are having problems with data syncing to your tablet through the cable? or (iii) other devices are not charging or syncing properly through the cable?"

In response to the user selecting each of the three choices (i), (ii) and (iii), the present embodiment (at 112, FIG. 4) recognizes a strong likelihood that the current cable is defective (rather than the problem being caused by the tablet itself, or a wall-plug converter used to provide power to the cable), and thereby learns or updates correlation strength values use in future problem determinations and associations for the user, and for the social contacts of the user via the social network. In contrast, in response to the user selecting only option (i), the present embodiment determines (at 112, FIG. 4) that it is more likely that the tablet firmware needs an update, and that the cable is in good working order (since the user is not experiencing the other suggested problems (ii) and (iii), and may suggest that the user update the firmware before purchasing a new cable.

Aspects reverse engineer, or work backward, from problem recognition and purchase information to identify issues solved by a purchased item as a function of correlating social and biometric data to potential issue solutions, and then autonomously identify and present additional problem and solution options to users, which are confirmed (or not), and wherein the choices may be shared on social networking sites for use and application to other users. This leads to autonomous improvement of existing solutions within knowledge databases, and to improved product recommendation and promotion of useful products, or services tailored, as a function of identifying and solving problems of individual users.

Problem and solution recognition by embodiments of the present inventions may be based on a variety of data inputs. Data acquired from sensors installed in various devices may be used to identify the efficiency and effectiveness of a product over a period of a time. For example, a sensor installed in a charger may provide data indicating that an output charging coil is operating well, but that the tablet device is not receiving adequate or expected power levels in a receiving side, and therefore that there is most likely a problem with the cable carrying the power to the tablet device. Thus, if the user is purchasing a new charger, the embodiment may suggest (at 110, FIG. 4) that the user instead purchase a new cable.

Embodiments may track biometric data indicative of interaction behavior with the tablet device over time, wherein the configured processor is enabled to determine that the tracked behavior has changed over time: for example, that the user is spending more time with, or more frequently, inserting or manipulating the charging cable, wherein the configured processor determines that there is (likely, most likely, etc.) a continuity problem with the cable that is causing this change in behavior. Thus, embodiments may process biometric data to determine behavior profiles or baseline behaviors and identify (likely) problem occurrences in response to determining changes in the profiled behavior or device interactions, including reductions or other changes in effectiveness or efficiencies of the devices or associate accessories relative to user usage patterns.

Embodiment enhance e-commerce opportunities and satisfaction by a user. More particularly, when a user knows that products or accessories are available to fix a problem and directly searches for such products to execute a purchase, embodiments of the present invention operate in the background to identify other associated problems or more (likely) satisfactory products with respect to solving a (likely) root problem of the user. Thus, such embodiments may suggest other (better) options for purchase; or other potential problems which, when selected, may lead to different, more satisfactory item purchase suggestions to the user, which are more likely to satisfy the actual needs of the user in problem amelioration.

Items may be suggested for purchase to ameliorate a given problem as a function of item metadata, via comparing the metadata to user and social network problem and purchase history, to thereby better identify the most likely problem that the user needs to solve through an item purchase.

Social network components receive sharing data inclusive of problem associations to purchased items, wherein embodiments creating a knowledgebase for use in generating item purchase recommendations to other users. Thus, a user not aware of an association of a given item purchase to a solution to a problem of the user is informed by embodiments of the present invention, in response to matching the user problem to the same or similar problem of a social contact that was solved by purchase of a recommended item.

In some embodiments a recommendation (at 110, FIG. 4) is triggered where a given user does not search for the item for more than an elapsed threshold limit of time, wherein the embodiment then steeps in and delivers an advertisement or recommendation of the item to solve the problem.

By using user tone, gestures or other biometric data of the user to identify that user is likely experiencing a problem and suggesting item purchases in response thereto, embodiments of the present invention provide improvement over existing solution and recommendation systems and processes, understanding that there may be problems or issues previously not accounted for or found in association to knowledge base solutions. By gathering information indicative of user frustrations with the use of products and using this information autonomously as a basis for problem issue determination and ameliorative product search, embodiments systematically help users identify problems and solution associations that would otherwise be unknown to the user.

The terminology used herein is for describing aspects only and is not intended to be limiting of the invention. As used herein, singular forms "a", "an", and "the" are intended to include the plural forms as well, unless the context clearly indicates otherwise. It will be further understood that the terms "include" and "including" when used in the specification specify the presence of stated features, integers, steps, operations, elements, and/or groups thereof. Certain examples and elements described in the present specification, including in the claims, and as illustrated in the figures, may be distinguished, or otherwise identified from others by unique adjectives (e.g. a "first" element distinguished from a "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply and precedence, ordering, or ranking of any certain elements, limitations, or process steps.

The descriptions of the carious embodiments of the present invention have been presented for the purposes of illustration but are not intended to be exhaustive or limited to the embodiments disclosed. Many modifications and variations will be apparent to those of ordinary skill in the art without departing for the scope and spirit of the described embodiments. The terminology used herein was chosen to best explain the principles of the embodiments, the practical applications or technical improvement over technologies found in the marketplace, or to enable others of ordinary skill in the art to understand the embodiments disclosed herein.

What is claimed is:

1. A computer-implemented method, comprising executing on a computer processor:

determining that an e-commerce site user is currently experiencing a first problem in association with a purchase of an item on the e-commerce site as a function of analyzing biometric data acquired from the user in association with the item purchase;

correlating the first problem associated with the item purchase to an alternative problem that is associated with the item purchase as a function of social network data of the user; and suggesting the alternative problem to the user as another problem experienced by the user in association with the item purchase.

2. The method of claim 1, further comprising:

integrating computer-readable program code into a computer system comprising a processor, a computer readable memory in circuit communication with the processor, and a computer readable storage medium in circuit communication with the processor; and wherein the processor executes program code instructions stored on the computer-readable storage medium via the computer readable memory and thereby performs the determining that the e-commerce site user is currently experiencing the first problem in association with the purchase of the item on the e-commerce site, the correlating the first problem associated with the item purchase to the alternative problem, and the suggesting the alternative problem to the user as another problem experienced by the user in association with the item purchase.

3. The method of claim 2, wherein the computer-readable program code is provided as a service in a cloud environment.

4. The method of claim 1, further comprising:

updating a strength of association of the alternative problem to the item purchase and to the first problem as a function of an amount of acceptance or rejection by the user of the suggested alternative problem as the another problem experienced by the user in association with the item purchase.

5. The method of claim 4, further comprising:

correlating the first problem associated with the item purchase to an alternative solution as a function of the social network data of the user;

suggesting the alternative solution as a replacement for the item purchase; and updating strength of association of the alternative solution to the item purchase and to the first problem as a function of an amount of acceptance by the user of the suggested alternative solution as a replacement for the item purchase.

6. The method of claim 4, wherein the biometric data is acquired from the user by a device that is selected from the group consisting of a camera, a visual data scanner, a microphone, a smart watch, a fitness tracker and an environmental biometric signal sensor.

7. The method of claim 6, wherein the acquired biometric data is selected from the group consisting of facial expression image data, vocal utterances, physical movements, heartbeat, heartrate, respiration amount, respiration rate, respiration constituent component, blood oxygen level, insulin level, blood sugar level, gait, sleep pattern and sleep quality data.

8. The method of claim 6, further comprising:
determining that an e-commerce site user is currently experiencing the first problem in association with the item purchase as a function that is selected from the group consisting of:
matching a facial pattern of the user to a labeled expression pattern;
matching a body movement to of the user to the labeled expression pattern; and
wherein a label of the labeled expression pattern is selected from the group consisting of grimace, pain, dismay, exasperation or displeasure.

9. A system, comprising:
a processor;
a computer readable memory in circuit communication with the processor; and
a computer readable storage medium in circuit communication with the processor; wherein the processor executes program instructions stored on the computer-readable storage medium via the computer readable memory and thereby:
determines that an e-commerce site user is currently experiencing a first problem in association with a purchase of an item on the e-commerce site as a function of analyzing biometric data acquired from the user in association with the item purchase;
correlates the first problem associated with the item purchase to an alternative problem that is associated with the item purchase as a function of social network data of the user; and
suggests the alternative problem to the user as another problem experienced by the user in association with the item purchase.

10. The system of claim 9, wherein the processor executes the program instructions stored on the computer-readable storage medium via the computer readable memory and thereby:
updates a strength of association of the alternative problem to the item purchase and to the first problem as a function of an amount of acceptance by the user of the suggested alternative problem as the another problem experienced by the user in association with the item purchase.

11. The system of claim 10, wherein the processor executes the program instructions stored on the computer-readable storage medium via the computer readable memory and thereby:
correlates the first problem associated with the item purchase to an alternative solution as a function of the social network data of the user;
suggests the alternative solution as a replacement for the item purchase; and
updates a strength of association of the alternative solution to the item purchase and to the first problem as a function of an amount of acceptance by the user of the suggested alternative solution as a replacement for the item purchase.

12. The system of claim 10, wherein the biometric data is acquired from the user by a device that is selected from the group consisting of a camera, a visual data scanner, a microphone, a smart watch, a fitness tracker and an environmental biometric signal sensor.

13. The system of claim 12, wherein the acquired biometric data is selected from the group consisting of facial expression image data, vocal utterances, physical movements, heartbeat, heartrate, respiration amount, respiration rate, respiration constituent component, blood oxygen level, insulin level, blood sugar level, gait, sleep pattern and sleep quality data.

14. The system of claim 12, wherein the processor executes the program instructions stored on the computer-readable storage medium via the computer readable memory and thereby:
determines that an e-commerce site user is currently experiencing the first problem in association with the item purchase as a function that is selected from the group consisting of:
matching a facial pattern of the user to a labeled expression pattern;
matching a body movement to of the user to the labeled expression pattern; and
wherein a label of the labeled expression pattern is selected from the group consisting of grimace, pain, dismay, exasperation or displeasure.

15. A computer program product for recognizing and solving a problem as a function of biometric data, the computer program product comprising:
a computer readable storage medium having computer readable program code embodied therewith, the computer readable program code comprising instructions for execution by a processor that cause the processor to:
determine that an e-commerce site user is currently experiencing a first problem in association with a purchase of an item on the e-commerce site as a function of analyzing biometric data acquired from the user in association with the item purchase;
correlate the first problem associated with the item purchase to an alternative problem that is associated with the item purchase as a function of social network data of the user; and
suggest the alternative problem to the user as another problem experienced by the user in association with the item purchase.

16. The computer program product of claim 15, wherein the computer readable program code instructions for execution by the processor further cause the processor to:
update a strength of association of the alternative problem to the item purchase and to the first problem as a function of an amount of acceptance by the user of the suggested alternative problem as the another problem experienced by the user in association with the item purchase.

17. The computer program product of claim 16, wherein the computer readable program code instructions for execution by the processor further cause the processor to:
correlate the first problem associated with the item purchase to an alternative solution as a function of the social network data of the user;
suggest the alternative solution as a replacement for the item purchase; and
update a strength of association of the alternative solution to the item purchase and to the first problem as a function of an amount of acceptance by the user of the suggested alternative solution as a replacement for the item purchase.

18. The computer program product of claim 16, wherein the biometric data is acquired from the user by a device that is selected from the group consisting of a camera, a visual data scanner, a microphone, a smart watch, a fitness tracker and an environmental biometric signal sensor.

19. The computer program product of claim 18, wherein the acquired biometric data is selected from the group consisting of facial expression image data, vocal utterances, physical movements, heartbeat, heartrate, respiration amount, respiration rate, respiration constituent component, blood oxygen level, insulin level, blood sugar level, gait, sleep pattern and sleep quality data.

20. The computer program product of claim 18, wherein the computer readable program code instructions for execution by the processor further cause the processor to:
   determine that an e-commerce site user is currently experiencing the first problem in association with the item purchase as a function that is selected from the group consisting of:
   matching a facial pattern of the user to a labeled expression pattern; and
   matching a body movement to of the user to the labeled expression pattern; and
   wherein a label of the labeled expression pattern is selected from the group consisting of grimace, pain, dismay, exasperation or displeasure.

\* \* \* \* \*